(12) United States Patent
Chevallier et al.

(10) Patent No.: US 7,106,335 B2
(45) Date of Patent: Sep. 12, 2006

(54) METHOD FOR DISPLAYING AN OBJECT IN A PANORAMA WINDOW

(75) Inventors: Louis Chevallier, La Mézière (FR); Nour Eddine Tazine, Noyal sur Vilaine (FR)

(73) Assignee: Thomson Licensing, Boulogne-Billancourt (FR)

( * ) Notice: Subject to any disclaimer, the term of this patent is extended or adjusted under 35 U.S.C. 154(b) by 12 days.

(21) Appl. No.: 10/433,200

(22) PCT Filed: Nov. 15, 2001

(86) PCT No.: PCT/FR01/03575

§ 371 (c)(1),
(2), (4) Date: May 29, 2003

(87) PCT Pub. No.: WO02/45412

PCT Pub. Date: Jun. 6, 2002

(65) Prior Publication Data

US 2004/0021668 A1 Feb. 5, 2004

(30) Foreign Application Priority Data

Nov. 29, 2000 (FR) .................................. 00 15411

(51) Int. Cl.
  *G06T 13/00* (2006.01)
  *H04N 7/00* (2006.01)

(52) U.S. Cl. ........................................ 345/474; 348/36

(58) Field of Classification Search ................ 345/649, 345/619–621, 623–624, 629, 632, 633, 473–474; 348/36

See application file for complete search history.

(56) References Cited

U.S. PATENT DOCUMENTS 5,495,576 A * 2/1996 Ritchey ....................... 345/420
5,745,126 A * 4/1998 Jain et al. .................... 382/154
5,963,213 A * 10/1999 Guedalia et al. ............. 345/473

(Continued)

FOREIGN PATENT DOCUMENTS

EP          919 956       6/1999
JP         2000-175185    6/2000
WO          00/79797     12/2000

OTHER PUBLICATIONS

*"Internet World"*, *"Four Photographic VR Technologies"*, XP-002150185, ComputerSelect Web, http://web4.computer-select.com/, Dec. 7, 1998, v.4, 140, p. 37.
Shenchang Eric Chen, *"QuickTime ® VR—An Image-Based Approach to Virtual Environment Navigation"*, Computer Graphics Proceedings, Annual Conference Series, 1995, pp. 29-38.

*Primary Examiner*—Matthew Luu
(74) *Attorney, Agent, or Firm*—Joseph J. Laks; Ronald H. Kurdyla; Joel M. Fogelson

(57) ABSTRACT

The invention relates to a method for displaying an object that features in a panorama moving on a screen. The method includes a step for positioning a target zone of the panorama surrounding the object in a predetermined window of the screen, and a step for replacing the said target zone of the panorama by a video sequence that includes the object, the positioning and replacement steps being activated in response to an activation control. Among other aspects, with this method, the visual discontinuities between the panorama and the video sequence can be reduced.

The invention also relates to a receiver of audiovisual transmissions, which receiver includes means for implementing the above method.

15 Claims, 2 Drawing Sheets

U.S. PATENT DOCUMENTS 6,337,683 B1 * 1/2002 Gilbert et al. .............. 345/629
6,356,297 B1 * 3/2002 Cheng et al. ................. 348/36
6,624,846 B1 * 9/2003 Lassiter ................... 348/211.4
6,654,019 B1 * 11/2003 Ripley et al. ............... 345/474

* cited by examiner

METHOD FOR DISPLAYING AN OBJECT IN A PANORAMA WINDOW

This application claims the benefit under 35 U.S.C. § 365 of International Application PCT/FR01/03575 filed on Nov. 15, 2001, which claims the benefit of French Application No. 00/15411 filed Nov. 29, 2000.

FIELD OF INVENTION

The present invention relates to a method for displaying an object in a window of a panorama.

BACKGROUND OF THE INVENTION

"Panorama" is understood to mean a method of rendering a real or virtual scene, this method enabling the scene to be partially displayed on a screen. It is thus expected to be able to move the panorama such that the entire scene is accessible to an observer who is located at the centre of this scene; the observer varies his viewing angle but not his viewpoint.

Presently, in a common way, panoramic scenes are being represented in three dimensions, and, by way of example, mention is made of the software "Quicktime VR" which is a registered trademark of the company Apple. Regarding this subject, reference can be made to the article "Quicktime VR—An Image Based Approach to Virtual Environment Navigation", S. E. Chen, SIG'GRAPH95.

An observer located at the centre of such a scene can rotate about himself to make his angle of view vary in the range 0° to 360°. The scene can therefore be represented by a cylinder which becomes a plane image when it is developed. This plane image is often a real image obtained by juxtaposing photographs taken successively after having made a camera rotate through an angle equivalent to the aperture angle of its lens. But this plane image can also be a virtual image. Only a part of the scene is displayed on the screen, which part corresponds to a sector of the cylinder, and the observer has direction controls to turn to the left or to the right in the scene.

While this type of representation reflects progress in relation to a plane representation, any object in the scene is always viewed by the same angle. To display several faces of this object, it is appropriate to provide a video sequence simulating an animation, for example a rotation around it, the object then appearing in various angles.

This video sequence will therefore replace the part of the panorama that appears on the screen. However, the transition from the panorama to the video sequence must take place by limiting, as far as is possible, discontinuities such as image jumps.

Thus, the aim of the present invention is a method for displaying a video sequence presenting an object which features in a panorama, limiting the discontinuity appearing between the display of the panorama and the display of this sequence.

SUMMARY OF THE INVENTION

The invention relates to a method for displaying an object that features in a panorama moving on a screen, which method is characterized in that it includes a step for positioning a target zone of the panorama surrounding the object in a predetermined window of the screen, and a step for replacing the said target zone of the panorama by a video sequence that includes the object, the positioning and replacement steps being activated by an activation control.

The activation control by the observer therefore enables the target zone to be positioned in a precisely defined window of the screen. The operation resulting from this command will not be described further since it poses no difficulties to the person skilled in the art.

The video sequence is then displayed in the window, and so the visual discontinuity is limited to this window and does not concern the whole screen.

Moreover it is appropriate to reduce the discontinuities even within the window. However, due to the displaying in three dimensions, the representation of the target zone, particularly its contour, depends on its position on the screen.

Thus, since the window features a reference representation of the target zone following the activation control, for the visual aspect it is preferable that the video sequence exhibits a contour identical to that of this reference representation.

As a preference, since the panorama is a result of an optical process having predetermined characteristics, the video sequence originates from the same optical and graphical process.

Advantageously, the window is positioned at the centre of the screen, this window being the position of the animation presenting the object.

According to a preferred embodiment, the first view of the video sequence is the static representation and, if necessary, the last view of this sequence is also the static representation.

Often, the target zone comes from a broadcast network.

The invention also relates to a receiver of audiovisual transmissions, which receiver includes means for implementing the above method.

BRIEF DESCRIPTION OF THE FIGURES

The present invention will now be described in greater detail in the context of the following description of example embodiments given for illustrative purposes with reference to the accompanying figures which show.

DETAILED DESCRIPTION OF THE INVENTION

Figure 1:
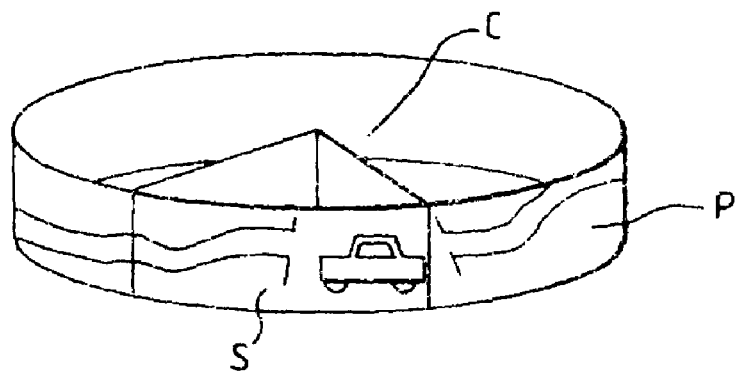
FIG. 1, a panorama.

With reference to FIG. 1, a panorama P represents an exterior scene viewed at 360° from an observation centre C. The panorama appears as a cylinder, a sector S (shown in dotted line in the figure) of which can be displayed on a screen.

The process of moving the displayed sector S so that the whole of the panorama P can be observed is known. The moving of this sector is accompanied by a deformation of the image which gives the observer the sensation of rotating at the centre of the scene.

Figure 2:
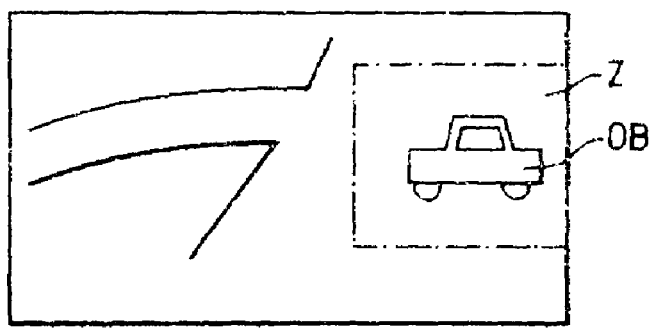
FIG. 2, a first view of the screen.

With reference to FIG. 2, the displayed sector includes an object OB, that is to say a car, which stands out in the panoramic scene. This object is embedded in a target zone Z. This target zone is, according to the present example, a square shown in dashed-dotted line in FIG. 2. The contour of the target zone is therefore in this case a border extending from the four sides of the square to the inside of the square.

Figure 3:
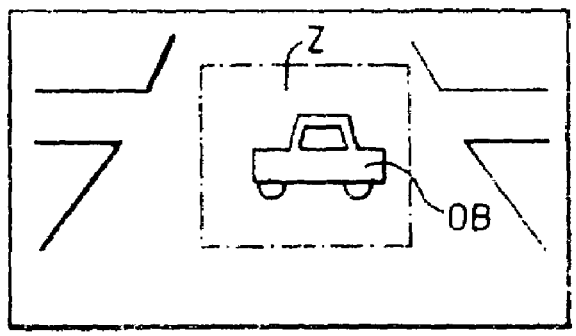
FIG. 3, a second view of this screen.

With reference to FIG. 3, activation control enables the panorama to be moved to bring the target zone into a window which occupies a predetermined position in the screen, for example at the centre of the screen. The operations initiated by this activation command will not be detailed further since they are easily accessible to the person skilled in the art.

Next, the panorama is immobilized and the content of the window corresponds to a static representation of the object OB or of the target zone Z which may be identical to the content of the target zone in FIG. 2.

This static representation is perfectly determined since it corresponds to an identified zone of the panorama.

Following the operation for centring the target zone Z, the method according to the invention proposes to replace the static representation in the window with a video sequence.

This video sequence can for example be a movie or a sequence of synthesis images resulting from a three-dimensional model.

However, to prevent an additional visual discontinuity on the screen when the video sequence is displayed, the first image of this sequence and preferably the following images have a contour that is identical to that of the static representation. Thus, visually the sequence appears to be embedded perfectly in the panorama.

Moreover it is appropriate to emphasize that the panorama has been produced according to a determined optical specification. First, the focal distance or the aperture angle of the lens taking the shots is considered. Thus, it is preferable that the video sequence meets the same specification to further minimize the discontinuities which could appear during display.

In practice, the video sequence is often a detailed presentation of the object OB viewed from various angles. The first image of the video sequence is thus advantageously identical to the static representation. As such, there are no image jumps on the screen. In addition, still concerned with preventing a visual discontinuity when the video sequence ends and when the panorama is presented to the observer again, the last image of this sequence is identical to the static representation.

The video sequence could be a presentation of the object, the angular position of which is controlled interactively by the observer. The observer would therefore see an object presented within the panorama. It is to be noted that the presentation of the object must include a fixed background in accordance with the static representation.

Moreover it is to be noted that the panorama can include several target zones each incorporating a separate object.

The method of the invention is easily implemented in a receiver of audiovisual transmissions which receives the panorama and video sequence from a broadcast network. In one embodiment, the panorama resides in the receiver, this panorama presenting for example the interior of a supermarket. The video sequences, for example showing objects for sale, are transmitted by the network.

Figure 4:
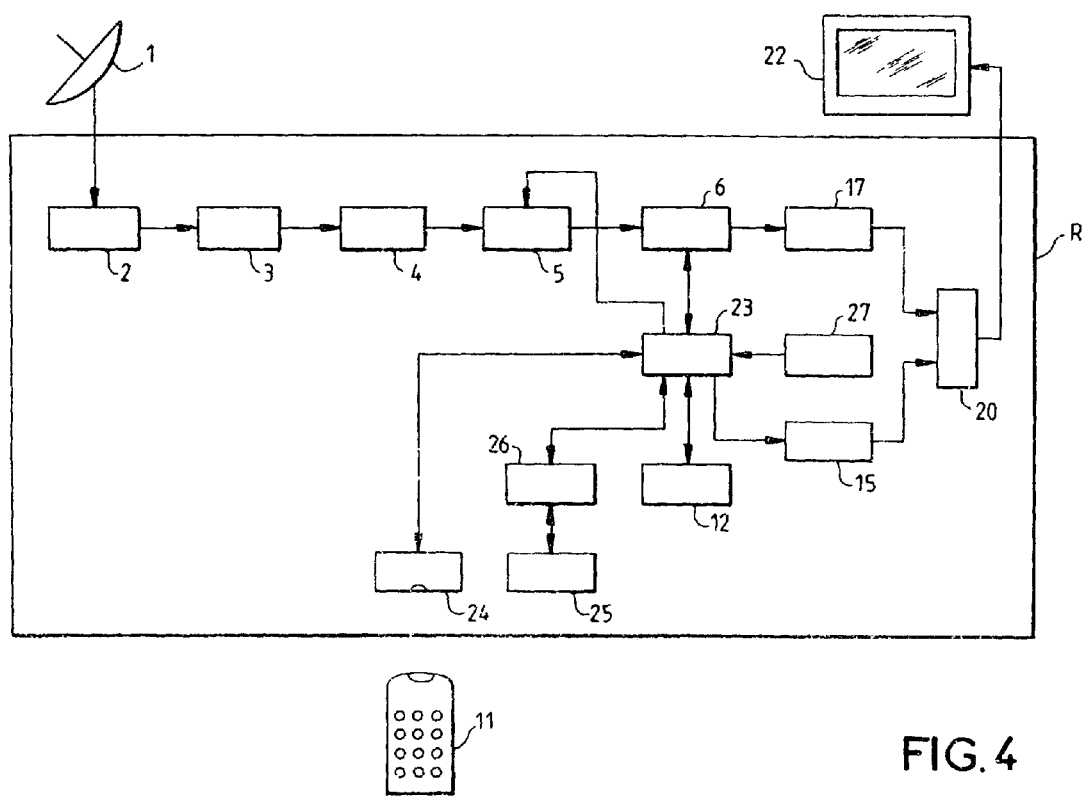
FIG. 4, a block diagram of a receiver suitable for implementing the invention.

With reference to FIG. 4, the receiver (R) is for example a decoder compliant with the DVB specifications and which uses an ISO/IEC 13818-1 transport layer.

An antenna 1 is connected to a tuner 2. The signal provided by the tuner is demodulated by a demodulator 3. The demodulator data is deinterlaced and corrected by an error-correcting circuit 4 and transmitted to a demultiplexer 5. The latter includes a certain number of filters programmed by a microprocessor 23 according to the various applications supported by the decoder. The microprocessor 23 is connected to a memory 12 containing the operating system and the resident or downloaded programs for running applications. The microprocessor is also connected to a clock circuit 27. A character generator 15 is used to generate menus of commands or of graphics concerning the parameters of the decoder or concerning a particular application. The video signal generated is multiplexed with one of the video signals originating from a video decoder 17 to a SCART connector connected to the television screen 22. The multiplexing circuit 20 is managed by the microprocessor 23. For the purposes of making the block diagram clear, only the most important connections of the microprocessor 23 are illustrated.

The audio or video packets or sections filtered by the demultiplexer are stored in predefined areas of a buffer memory 6. The decoder may also have a hard disk 25 connected to the microprocessor via an interface 26 enabling high-speed information transfers. The decoder is also equipped with an infrared remote control unit 11 connected to the microprocessor via another interface 24.

The above-described example embodiments of the invention have been chosen for their practical significance. It would not however be possible to exhaustively list all the embodiments that this invention covers. In particular, any method described can be replaced by an equivalent method without departing from the scope of the present invention.

What is claimed is:

1. Method for displaying an object that moves in a panorama for presentation on a screen, comprising the steps of:
   A. positioning the panorama as to bring a predetermined target zone of the panorama surrounding the object in a predetermined window of the screen; and
   B. replacing the predetermined target zone of the panorama with a video sequence that includes the object, wherein the positioning and replacement steps are activated by an activation control.

2. Method according to claim 1, wherein the window features a reference representation of the target zone following the said activation control, the said video sequence exhibits a contour identical to that of this reference representation.

3. Method according to claim 1, wherein the moving of the video sequence is controlled by the user.

4. Method according to claim 1 wherein the window is positioned at the center of the screen.

5. Method according to claim 1, wherein the first view of the said video sequence is identical to the reference representation.

6. Method according to claim 5, wherein the last view of the said sequence is identical to the reference representation.

7. Method according to claim 1, wherein the data of the said target zone comes from a broadcast network.

8. Method of claim 1, wherein a receiver of audiovisual transmissions implements the method.

9. A method for displaying the movement of an object in a panorama representative of a virtual scene of three dimensions comprising the steps of:
   A. displaying the panorama, wherein the object is presented in the panorama;
   B. replacing part of the panorama with a video sequence, wherein the video sequence represents movement and positioning the panorama to bring the part of the panorama in a predetermined window of the displayed picture of the object in response to an activation sequence; and
   C. rendering the video sequence in a target zone, wherein the target zone exhibits a contour to reduce visual discontinuity of the target zone in the panorama.

10. Method of claim 9, wherein the target zone occupies the center of the panorama.

11. Method of claim 9, wherein a decoder renders the panorama.

12. Method of claim 9, wherein a first image of the video sequence is identical to a static representation of the object in the panorama.

13. Method of claim 12, wherein a last image of the video sequence is identical to the static representation of the object in the panorama.

14. The method of claim 1, wherein during said replacement step
   the panorama is immobilized preventing movement of the panorama during playback of the video sequence enabling a contour of the video sequence in the predetermined target zone to approximately match a contour of a static representation displayed in said panorama that is replaced in the replacement step.

15. The method of claim 9, wherein during said replacement step
   the panorama is immobilized preventing movement of the panorama during playback of the video sequence enabling said contour of the video sequence in the target zone to approximately match a contour of a static representation displayed in the part of the panorama that is replaced.

* * * * *